Nov. 21, 1933.  W. MUELLER  1,936,308
APPARATUS FOR MIXING GASEOUS AND LIQUID SUBSTANCES
Filed Aug. 27, 1931  3 Sheets-Sheet 1

Inventor
Wilhelm Mueller
by Wilkinson & Mawhinney
Attorneys.

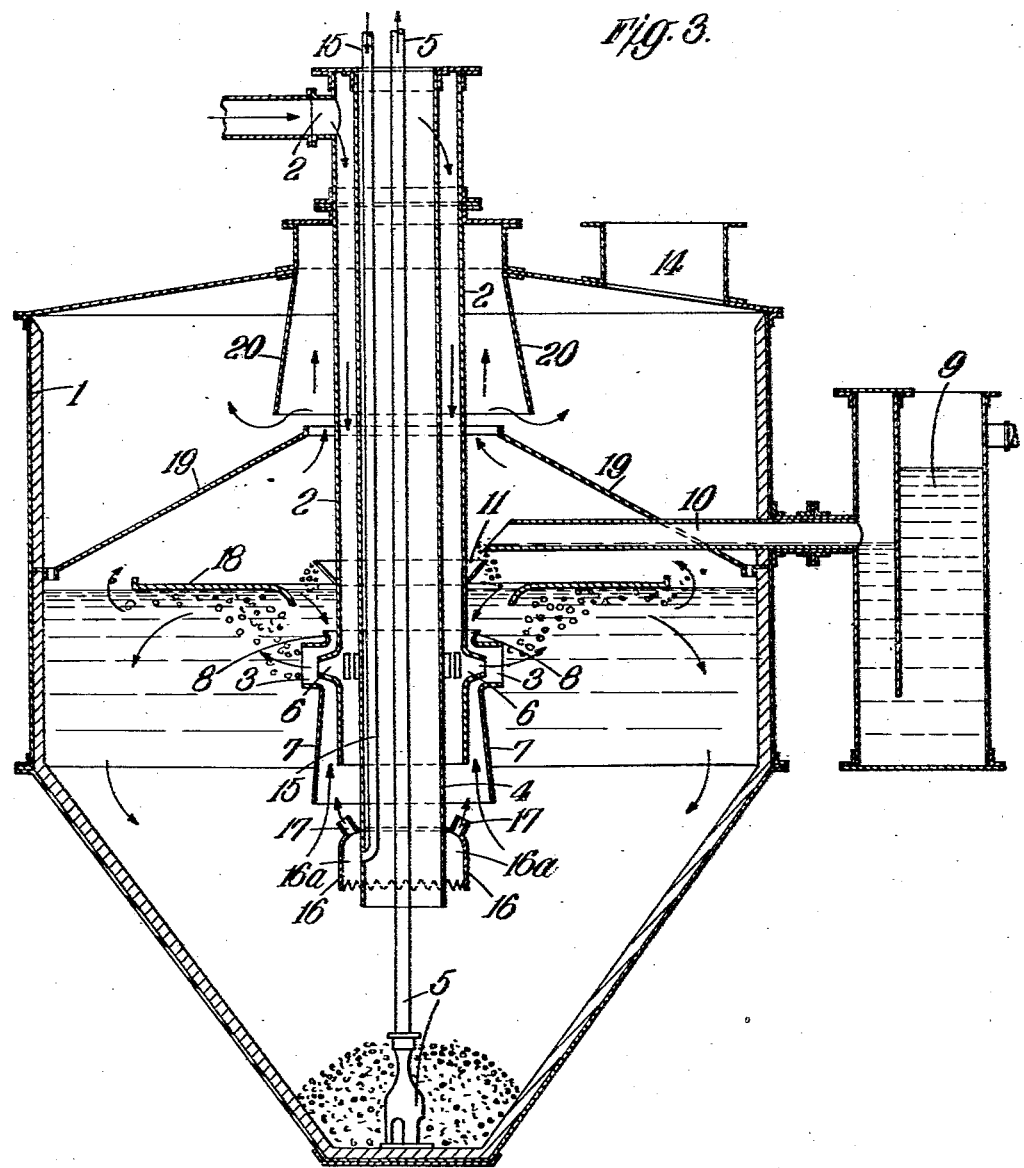

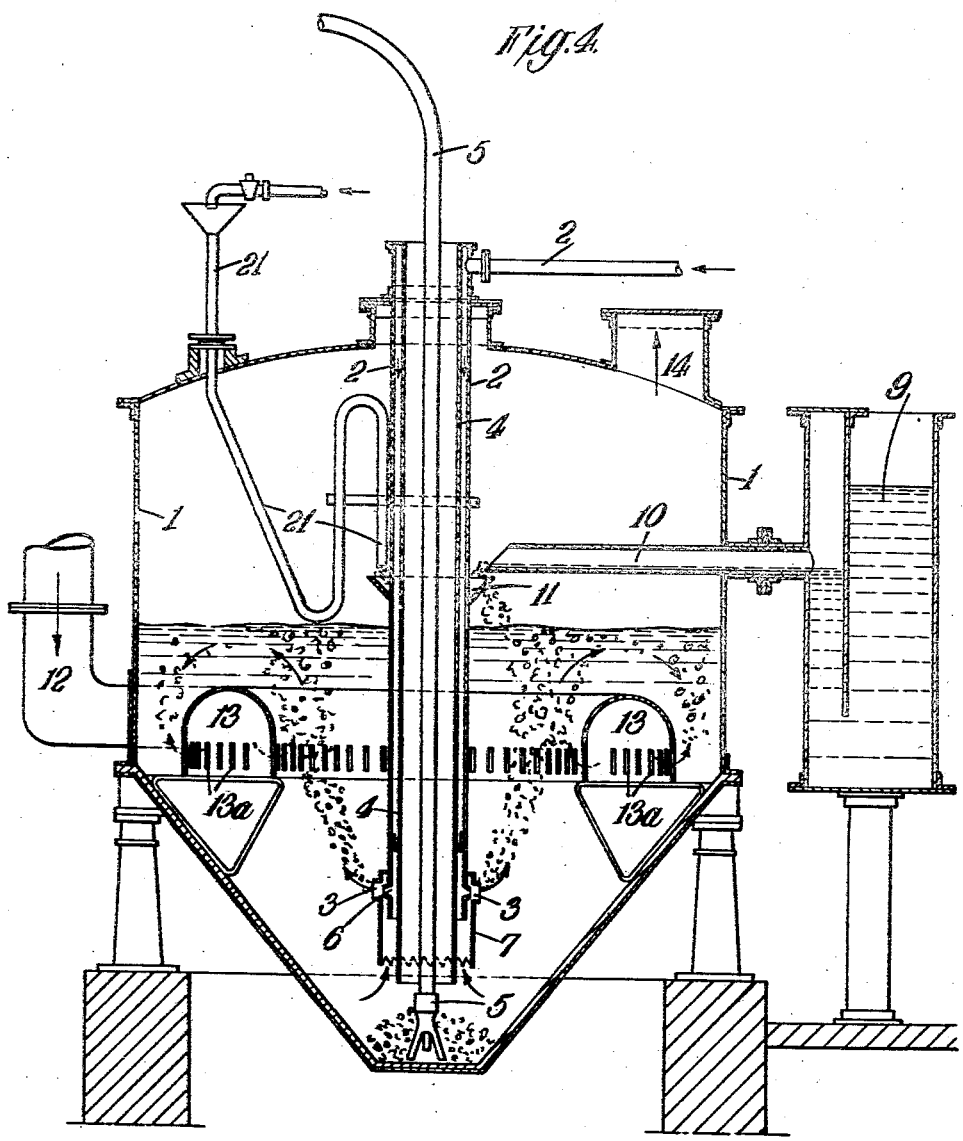

Patented Nov. 21, 1933

1,936,308

UNITED STATES PATENT OFFICE 1,936,308

APPARATUS FOR MIXING GASEOUS AND LIQUID SUBSTANCES

Wilhelm Mueller, Gleiwitz, Germany

Application August 27, 1931, Serial No. 559,792, and in Germany November 10, 1930

11 Claims. (Cl. 261—123)

The invention relates to apparatus for mixing gases or/and vapors or/and air with liquids for the purposes of carrying out chemical reactions; and is intended to effect intensive penetration of the gases or/and vapors or/and air into the liquor and a positive rotation of the liquid, so that the gases or/and vapors or/and air and liquids are quickly and thoroughly mixed with one another under great agitation and turbulence thereof in the saturator or mixing chamber; and the present invention may be applied and used for the following (inter alia) purposes, viz:—

1. In the production of ammonium sulphate or like salts.
2. In the absorption of ammonia from coal or distillation gases when the absorbing medium is sulphuric acid-lye.
3. In the absorption of $H_2S$ from coal gases, when the absorbing medium is caustic soda or lime-liquor.
4. In the saturation and purification of raw-sugar, by using carbon dioxide $CO_2$, which is forced through the gas-pipe and nozzle arrangement, into the liquor of sugar-melasse, of the saturator.

Apparatus and saturators are already known or have heretofore been proposed in which ammoniacal gas or vapour is introduced into the liquid bath through a centrally disposed pipe the lower end of which is provided with a ribbed circular guide plate or with stationary or rotary vanes. However, since both the guide plates and vanes in such known or heretofore proposed apparatus dip, with a downward opening, into the bath, the admitted current of gas can set only the surface of the bath in motion, so that the liquor in the conical lower portion of the saturator remains comparatively stagnant.

According to the present invention an apparatus for mixing gases or/and vapors or/and air with liquids, for the purposes referred to in the first preceding paragraph, comprises a saturator or mixing chamber in which is contained a bath of the liquid or liquids to be treated, a central gas or/and vapour supply pipe dipping into the bath of liquid and provided with a plurality of radial discharge nozzles or nozzle-like openings located at any desired depth below the level of the bath of liquid or liquids for example said nozzles or openings may be situated near the upper level of the liquid in the bath but submerged, a stationary gas distributing element having a plurality of radially disposed vanes arranged around and communicating with said nozzles and openings above and below said distributing element, through which the liquid can pass to the vanes of the distributing element.

The method of the present invention consists in blowing gases or/and vapours or/and air under pressure into a bath of liquid through a system of straight or spirally disposed nozzles and fixed guide vanes, so as to entrain the liquid injector-wise through upper and lower guide openings and to set up a positive circulation of the liquid with thorough intermingling with the said gases and/or vapours or, where air is employed, with the result of making the liquid thoroughly homogeneous by turbulence and agitation. Hereinafter for the sake of brevity I will refer to the aforesaid gases or/and vapors or/and air as the "gaseous substances".

In the accompanying drawings I have illustrated apparatus according to my present invention as follows:—

Fig. 3 is a similar view to Fig. 1 but illustrates a modified arrangement.

Fig. 4 is a similar view to Figs. 1 and 3 and illustrates another modification.

Figure 1:
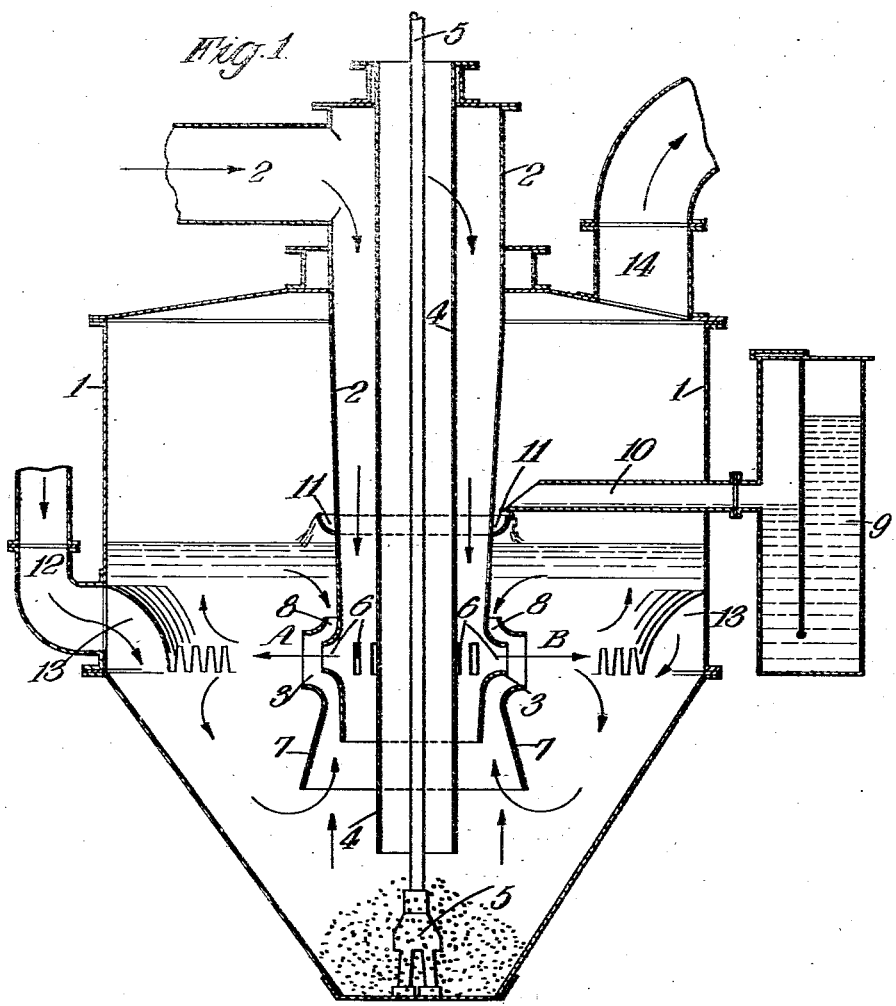
Fig. 1 is a view in central vertical section of an apparatus according to my present invention.

Referring to the drawings and more particularly to Fig. 1 thereof:—

1 denotes the casing of a saturator.

Figure 2:
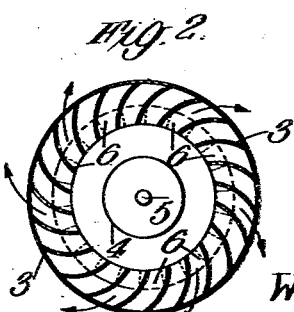
Fig. 2 is a horizontal section on the line A—B through the nozzles and distributing device of Fig. 1.

2 is a gas-supply pipe, around the lower end of which is arranged a circular gas distributor 3, provided with radially curved guide vanes (see Fig. 2) and 4 is a pipe for the introduction of a salt ejector pipe 5, detachably arranged inside the gas-supply pipe 2.

12 is a gas-supply pipe which introduces the ammoniacal gas into the saturator, through a submerged ring 13, which latter may be replaced by any suitable submerged pipe or distributing nozzles, in known manner, and adapted to be employed in combination with the above described arrangement according to the present invention.

14 is an outlet pipe for gas or vapour.

The saturator is filled in a known manner to a certain height with a liquor containing sulphuric acid, which latter is separately supplied, and continuously replenished, from a supply tank 9 through a pipe 10 to an annular overflow gutter or channel 11 located above the level of the liquid in the saturator and disposed centrally of the saturator.

According to my invention, the gas-supply pipe 2 is provided (below the level of the bath of liquor and for example as shown in the upper zone of the bath) with special nozzles 6, radially curved and opening into the radially curved or turbine-pattern vanes of the distributor 3. Below this point, the supply pipe 2 extends for a certain distance beyond the nozzles 6 and distributor 3, in order that the admitted gas may be compelled to enter the bath liquor through the nozzles and the distributor. Moreover, the under sides of the distributing vanes are closed by a plate and connected with a special flared guiding pipe or jacket 7, intended to assure the positive flow of the liquor from below up to the nozzles 6 and distributing vanes 3. Similarly, on the upper side of the distributor 3, an opening 8 is provided all round the gas pipe 2, in order to admit the liquor to the vanes of the distributor 3 from above at the same time.

Referring now more particularly to Fig. 3 of the accompanying drawings:—

In this modified arrangement the vertical pipe 4 (through which is passed the salt ejector pipe 5) is provided at its lower end submerged in the bath, with an annular jacket 16 thus providing the annular conduit 16a around the pipe 4.

The annular jacket 16 is open at its lower end and closed at its upper end the latter however, being provided with upwardly extending tuyères or nozzles 17.

15 is a downwardly extending pipe the lower end of which opens into the annular conduit 16a for the supply of compressed gas or air into said annular jacket; or acid or other liquor may be delivered (under pressure) through this pipe 15 into the annular conduit 16a from which latter said gas, or air, or liquor, can pass through the nozzles 17, into the lower part of the saturator bath, viz. just below the main gas distribution arrangement 2, 3, 6, 7, and 8.

Furthermore; 18 is a circular baffle plate located in the upper level of the liquid bath and 19 is a circular sloping cover plate (each with a circular central opening therein) arranged and mounted within the saturator; the cover plate 19 being located just above the upper level of the liquid bath whereby moist gas or/and vapours escaping from the bath are delivered radially outwardly under the canopy 20 in order to provide for the restriction or reduction of the amount of moisture in the ascending stream of gaseous substances on their way to the outlet 14.

Referring now more particularly to Fig. 4 of the accompanying drawings:—

In this modified arrangement; the pipe 12 (for the supply of ammoniacal gas into the saturator) is connected to the circular distributing passage or conduit 13 of inverted U shape, and this annular passage-way is provided on both sides thereof with numerous slots 13a through which latter the ammoniacal gas is delivered into the saturator and thoroughly distributed all round the interior of the saturator on both sides of the passage-way 13.

In this arrangement the parts forming the gas distribution arrangement 3, 4, 6, 7, and 8 are located much lower down in the saturator (i. e. much lower down on the pipe 4) than in the arrangement shown in Figs. 1 and 3 respectively.

Furthermore in the modified arrangement shown in Fig. 4 provision is made for a supplementary supply of fresh acid, liquor and acid, through the pipe 21 to the annular overflow gutter or channel 11.

The aforesaid location of the parts constituting the gas distribution arrangement 2, 3, 6, 7, and 8 in the lowest possible—or very low—position in the saturator namely only just above the heap of the accumulating salts in the bottom of the saturator, is of very great importance and advantage as same enables the continuous stirring up (tubulence and agitation) of the liquor in the bath and of the small salt particles in the bath thereby forces them upwards (above the vanes of the distributor 3) while the whole bath of liquor is in a state of turbulence and agitation as aforesaid.

By means of these devices, the gas supplied to the saturator 1 through the pipe 2 is compelled to produce a continuous circulation of the liquor and an intensive absorption of gas, because the gas nozzles 6 and vanes of the distributor 3, (after the manner of a turbine) draw the liquor from above and below, and thereby a continuous and intimate intermingling of the entire bath is set up, approximately in the direction of the arrows.

In the manufacture of sulphate of ammonia, this arrangement affords the advantage of a continuous circulation of the liquor and also of the fine particles of the salt, which, through the continuous circulation, grow into large crystals until, finally, they separate out from the flow of liquid by gravitation, sink down and settle in the cone of the saturator. From this position they are removed by means of the ejector, and are dried in the usual way. Since on the other hand, fresh supplies of acid and liquor are admitted into the centre of the bath from above, the continuous circulation of the bath maintains the liquor in a uniform state of composition, so that the operation can be performed with a very low acid content in the bath. For this reason, the ammonium salt formed is also necessarily free from any uncombined acid, and can therefore, be obtained as a perfectly neutral salt, in the form of coarse crystals.

In using the apparatus of this invention for the above described process the auxiliary gas supplying means (15, 16, 17 in Fig. 3) is of special value. The upward current of gas from the nozzles 17 performs the function of blowing up into the downward extension 7 of the injector device 3, 6, 8 the small particles of salt held in suspension in the bath and thus keeps them in circulation and prevents them from settling to the bottom of the bath and thus promotes their growth into large crystals.

Since in coking plants and gasworks, the gas is always introduced under heavy pressure into the saturator, the turbine-pattern nozzles and also the upper and lower deflecting and guiding devices, produce a completely automatic positive circulation and intermingling of the bath, by means of the gas itself and without extraneous appliances. The arrangement can also be employed in other chemical washing processes, in which, in the absence of gas, compressed air may be used. The circulation pumps hitherto required in other saturators, are quite unnecessary. Moreover, the saturator does not contain any movable parts, so that it is more easily managed and more reliable in operation.

What I claim is:—

1. In an apparatus including a vessel of the saturator type for carrying out chemical reactions in a bath of liquid, stationary means for securing turbulence of the liquid and thorough admixture of the reagents including a central pipe extending downwardly into the liquid bath for the supply of a gaseous substance under pressure, together with an injector-device arranged below the liquid level of said bath and comprising a plurality of nozzles integral with said central pipe and extending radially outwards therefrom, an annular mixing chamber surrounding said central pipe and said nozzles, annular indraught openings to said mixing chamber arranged above and below said nozzles, substantially radial discharge openings from said mixing chamber intermediate the indraught openings and substantially in line with said nozzles and a plurality of guide vanes arranged in said mixing chamber.

2. In an apparatus as claimed in claim 1, the feature of making the guide vanes spirally curved in plan to promote horizontal swirling of the liquid bath.

3. In an apparatus as claimed in claim 1, the provision of an extension to the central pipe extending downwardly below the radial nozzles.

4. In apparatus as claimed in claim 1, the provision of additional means for introducing gaseous substances to the lower part of the bath, said means including an annular conduit surrounding the central pipe below and adjacent the injector device, separate gas supply means for said conduit and upwardly directed discharge outlets therefrom.

5. In an apparatus as claimed in claim 1, the provision of a flared downward extension to the annular mixing chamber.

6. In an apparatus as claimed in claim 1, the provision of means for supplying fresh liquid to the bath including an annular gutter arranged around the central pipe above the level of the liquid in said bath.

7. In an apparatus as claimed in claim 1, the provision of gas baffle means including a circular plate arranged at the level of the liquid surface with an annular opening between said plate and the central pipe.

8. In an apparatus as claimed in claim 1, the provision of moisture trapping means including at least one internal hood of inverted conical form arranged above the level of the liquid in the bath.

9. In an apparatus as claimed in claim 1, the provision of means for supplying gaseous substance to the liquid bath peripherally of said bath and below the level of the liquid therein.

10. In an apparatus as claimed in claim 1, the provision of means for supplying gaseous substance to the liquid bath peripherally of said bath and below the level of the liquid therein, said means including an annular conduit of inverted U-section having openings in its outer and inner faces.

11. In an apparatus as claimed in claim 1, the provision of means for supplying gaseous substance to the liquid bath peripherally of said bath and below the level of the liquid therein, said means including an annular member projecting inwardly and downwardly from the inner edge of the saturator-vessel, the lower edge of said member being deeply indented.

WILHELM MUELLER.